United States Patent
Lee et al.

(10) Patent No.: US 9,812,910 B2
(45) Date of Patent: Nov. 7, 2017

(54) METHOD FOR MOUNTING STATOR CORE ON GENERATOR ASSEMBLY USING THE SAME

(71) Applicant: DOOSAN HEAVY INDUSTRIES & CONSTRUCTION CO., LTD., Changwon-si (KR)

(72) Inventors: Sang Man Lee, Changwon-si (KR); Se Wook Oh, Changwon-si (KR); Mooseok Kwak, Gyeongsan-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 268 days.

(21) Appl. No.: 14/592,553

(22) Filed: Jan. 8, 2015

(65) Prior Publication Data
US 2015/0207369 A1 Jul. 23, 2015

(30) Foreign Application Priority Data

Jan. 17, 2014 (KR) .................. 10-2014-0006334

(51) Int. Cl.
*H02K 1/18* (2006.01)
*H02K 1/20* (2006.01)
*H02K 15/02* (2006.01)

(52) U.S. Cl.
CPC ............. *H02K 1/20* (2013.01); *H02K 1/185* (2013.01); *H02K 15/02* (2013.01); *H02K 15/028* (2013.01); *Y10T 29/49009* (2015.01)

(58) Field of Classification Search
CPC .... H02K 15/02; H02K 15/024; H02K 15/028; H02K 15/03; H02K 1/185; H02K 1/20; Y10T 29/49009
See application file for complete search history.

(56) References Cited

U.S. PATENT DOCUMENTS

| 4,891,540 A | 1/1990 | Cooper et al. |
| 6,242,825 B1 | 6/2001 | Mori et al. |
| 8,040,014 B2 | 10/2011 | Boardman, IV et al. |
| 2002/0074884 A1 | 6/2002 | Fuller |
| 2012/0043861 A1 | 2/2012 | Allen et al. |

FOREIGN PATENT DOCUMENTS

| CN | 103109441 A | 5/2013 |
| EP | 0 893 871 A2 | 1/1999 |
| JP | 2000-078781 A | 3/2000 |
| JP | 3811405 B2 * | 8/2006 |
| JP | 2013-534402 A | 9/2013 |
| KR | 10-0841963 B1 | 6/2008 |
| TW | 428355 B | 4/2001 |

OTHER PUBLICATIONS

Communication dated May 17, 2016 from the European Patent Office in counterpart Application No. 15151303.3.
Office Action dated Dec. 12, 2016 issued by the State Intellectual Property Office in counterpart Chinese Patent Application No. 201410645052.4.

* cited by examiner

*Primary Examiner* — Carl Arbes
(74) *Attorney, Agent, or Firm* — Sughrue Mion, PLLC

(57) ABSTRACT

Provided is a method for mounting a stator core on a generator, the generator having key bars and spring bars disposed between the key bars and a frame body, the method including pre-laminating stator core sheets to form a stator core bundle in a given unit; conveying the stator core bundle laminated in the given unit; and mounting the stator core bundle on the inner peripheral surface of the frame body.

12 Claims, 10 Drawing Sheets

METHOD FOR MOUNTING STATOR CORE ON GENERATOR ASSEMBLY USING THE SAME

CROSS-REFERENCE TO RELATED APPLICATION

This application claims priority to Korean Patent Application No. 10-2014-0006334, filed on Jan. 17, 2014 the disclosure of which is incorporated herein by reference in its entirety.

BACKGROUND

Field

Apparatuses and methods consistent with exemplary embodiments relate to a method for mounting a stator core on a generator and a generator using the same, and more particularly, to a method for mounting a stator core on a generator, a generator, and a stator core assembly wherein the working time required when the stator core is mounted on the inner peripheral surface of a frame body is reduced.

Background of the Related Art

A generator rotates by a power device operating by various energy sources and produces power through the rotating force. The generator includes a stator on which power induction coils are wound for the power generation and a rotor corresponding to the stator.

The rotor is rotatably disposed inside a frame body as a body of the generator, and the stator is fixedly disposed on the inner peripheral wall of the frame body. Such generation components are commonly applied to small and large-sized generators.

In the related art, the large-sized generator connected to a turbine is more complicated in the structure of the stator and the rotor than the small-sized generator. For example, the coil applied to the stator has a shape of a pipe along which a cooling fluid flows upon the production of power.

If the stator for the large-sized generator is mounted on the inner peripheral wall of the frame body, the stator is fixed thereto by means of various components, for example, key bars mounted in a longitudinal direction of the frame body on the inner peripheral surface of the frame body with given intervals formed along a circumferential direction of the frame body.

As shown in FIG. 1, a key bar 14 is mounted directly on a frame body 10 by means of welding, and as shown in FIG. 2, the key bar 14 is mounted on the frame body 10 by means of spring bars 12.

If the key bar 14 is mounted directly on the frame body 10 by means of welding as shown in FIG. 1, the stator is mounted in the state where the key bar 14 is completely fixed to the frame body 10 after the welding, and in this case, accordingly, there is no difficulty in mounting a donut-shaped stator core bundle on the inner peripheral surface of the frame body 10.

However, if the key bar 14 is mounted on the frame body 10 by means of the spring bars 12, as shown in FIG. 2, the stator in the form of fan-shaped stator core sheets 1 as shown in FIG. 4, not in the form of the donut-shaped stator core bundle as shown in FIG. 3, should be manually mounted on the frame body 10, which causes many inconveniences in the installation.

In this case, as shown in FIGS. 4 and 5, a plurality of first fixing jigs 30 is disposed in the longitudinal direction of the key bar 14 so as to align the key bar 14 and the spring bars 12. In this case, if the donut-shaped stator core bundle enters the frame body 10, spatial interferences of the first fixing jigs 30 occurs.

So as to remove the above-mentioned problem, accordingly, the interference between the first fixing jigs and the stator core bundle should be removed, and the precise alignment of the key bars has to be achieved so that dove tails of the key bars are precisely fitted to key bar grooves of the stator core sheets in the state where no interference between the first fixing jigs and the stator core bundle occurs. Further, there is a need to provide a conveyor capable of conveying the stator core bundle laminated at the outside of the frame body to the inner peripheral surface of the frame body and mounting the stator core bundle thereon.

SUMMARY

Accordingly, in view of the above-mentioned problems occurring in the prior art, one or more exemplary embodiments provide a method for mounting a stator core on a generator and a generator using the same wherein when the stator core is mounted on the inner peripheral surface of a frame body of the generator on which spring bar type key bars are disposed, the stator core is mounted in the form of a donut-shaped stator core bundle thereon, thus reducing the manufacturing time and cost.

To accomplish the above-mentioned object, according to an aspect of an exemplary embodiment, there is provided a method for mounting a stator core on a generator having key bars and spring bars disposed between the key bars and a frame body, the method including the key bar mounting operation of mounting the key bars on the spring bars pre-built on the frame body; the key bar alignment adjusting operation of adjusting the relative distance between the key bars and the spring bars to adjust the alignment of the key bars; and the donut-shaped stator core bundle mounting operation of fitting key bar grooves formed on the stator core to dove tails formed on the key bars when the stator core bundle is vertically descended to the interior of the frame body and mounted on the inner peripheral surface of the frame body.

According to an exemplary embodiment, desirably, the key bar alignment adjusting operation includes the lower alignment adjusting operation of mounting at least one or more first fixing jigs on the space between one side of the lower portion of each key bar and one side of the lower portion of one side spring bar of the spring bars on which the key bar is disposed, so as to adjust the alignment of the lower sides of the key bars.

According to an exemplary embodiment, desirably, the key bar alignment adjusting operation includes the upper alignment adjusting operation of mounting at least one or more second fixing jigs on the space between one side of the upper portion of each key bar and one side of the upper portion of one side spring bar of the spring bars on which the key bar is disposed, so as to adjust the alignment of the upper sides of the key bars.

According to an exemplary embodiment, desirably, the key bar alignment adjusting operation includes the upper alignment fixing operation of mounting fixing wedges on the gaps between the top end of each key bar and the top end portions of the spring bars on which the key bar is disposed, so as to fix the alignment of the upper sides of the key bars adjusted by means of the second fixing jigs.

According to an exemplary embodiment, desirably, the method further includes the donut-shaped stator core bundle forming operation of laminating the stator core sheets at the outside of the frame body to form the donut-shaped stator core bundle, before the donut-shaped stator core bundle mounting operation.

According to an exemplary embodiment desirably, in the donut-shaped stator core bundle forming operation, fan-shaped stator core sheets are connected in a circumferential direction to form a donut-shaped stator core sheet, and the donut-shaped stator core sheets are laminated to form a stator core lamination structure, wherein in the state where the stator core lamination structures are laminated on top of each other, spacing plates are mounted between the neighboring stator core lamination structures to provide space in which a cooling fluid moves from the inner peripheral side of the stator core toward the outer peripheral side of the stator core.

According to an exemplary embodiment, desirably, each spacing plate has a plurality of spacing beams mounted circumferentially in given intervals to form cooling passages in the space therebetween.

According to an exemplary embodiment, desirably, the stator core bundle in which the spacing plates are disposed has clamping grooves formed in given intervals on the outer peripheral surface thereof so as to fit clamping jigs of a conveyor thereto, and the spacing beams whose outer ends are located on the positions where the clamping grooves are formed have the outer ends shorter than those of the neighboring spacing beams, thus preventing the interference with the clamping jigs of the conveyor.

To accomplish the above-mentioned objects, according to an aspect of an exemplary embodiment, there is provided a generator including: a cylindrical frame body; a plurality of spring bars mounted on the inner peripheral surface of the frame body in a longitudinal direction of the frame body with given intervals in a circumferential direction of the frame body; and a plurality of key bars each disposed between the spring bars to support the stator core thereagainst, wherein the stator core has a plurality of stator core lamination structures each having donut-shaped stator core sheets laminated on top of each other and spacing plates mounted between the neighboring stator core lamination structures to provide space in which a cooling fluid moves from the inner peripheral side of the stator core toward the outer peripheral side of the stator core.

According to an exemplary embodiment, desirably, the stator core lamination structures and the spacing plates have key bar grooves formed on the outer peripheral surfaces thereof in such a manner as to be fitted to the dove tails formed on the key bars and clamping grooves formed in at least one or more spaces between the neighboring key bar grooves, and the spacing beams whose outer ends are located on the positions where the clamping grooves are formed have the outer ends shorter than the outer ends 61a of the neighboring spacing beams.

To accomplish the above-mentioned objects, according to an aspect of an exemplary embodiment, there is provided a stator core assembly including: a plurality of stator core lamination structures each having donut-shaped stator core sheets laminated on top of each other; and spacing plates mounted between the neighboring stator core lamination structures to provide space in which a cooling fluid moves from the inner peripheral side of the stator core toward the outer peripheral side of the stator core, each spacing plate having a plurality of spacing beams mounted circumferentially in given intervals to form cooling passages in the space therebetween.

According to an exemplary embodiment, desirably, the stator core lamination structures and the spacing plates have key bar grooves formed on the outer peripheral surfaces thereof in such a manner as to be fitted to the dove tails formed on the key bars and clamping grooves formed in at least one or more spaces between the neighboring key bar grooves, and the spacing beams whose outer ends are located on the positions where the clamping grooves are formed have the outer ends shorter than the outer ends of the neighboring spacing beams.

BRIEF DESCRIPTION OF THE DRAWINGS

The above and/or other aspects of the disclosure will become apparent and more readily appreciated from the following detailed description of exemplary embodiments, taken in conjunction with the accompanying drawings, in which.

DETAILED DESCRIPTION

Figure 1:
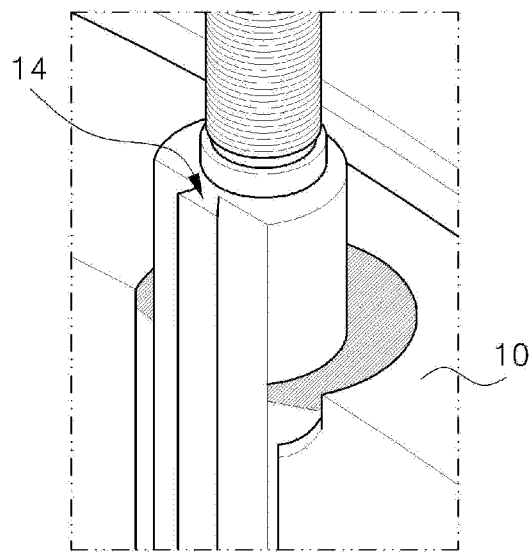
FIG. 1 is a perspective view showing a welding type key bar of the related art.

Hereinafter, an explanation on a method for mounting a stator core on a generator, a generator, and a stator core assembly according to exemplary embodiments will be in detail given with reference to the attached drawing.

While this invention is illustrated and described in the exemplary embodiments, the device may be produced in many different configurations, forms, and characteristics. Those skilled in the art will envision many other possible variations within the scope of the inventive concept. In the description, similar reference numerals in the drawings have the same or similar functions as each other or to each other, and the thicknesses of the lines or the sizes of the components shown in the drawing may be magnified for the clarity and convenience of the description.

Figure 6:
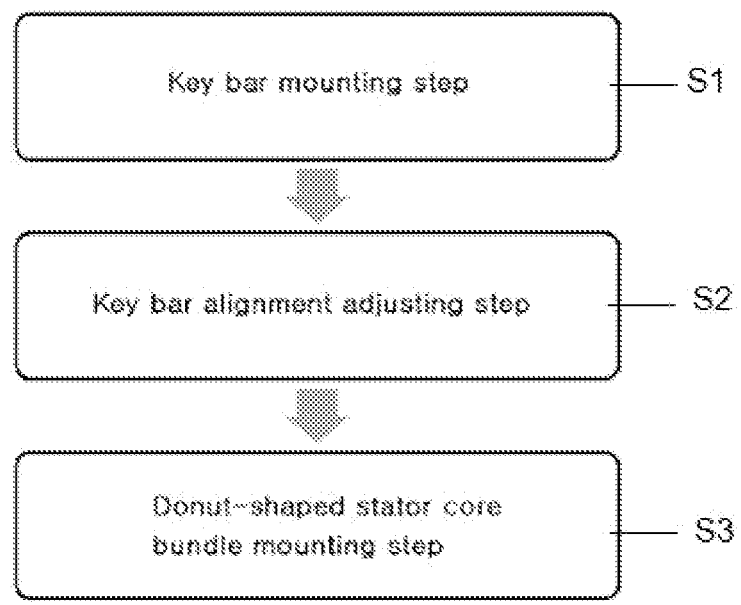
FIG. 6 is a flow chart showing a method for mounting a stator core on a generator according to an exemplary embodiment.

As shown in FIG. 6, a method for mounting a stator core on a generator according to an exemplary embodiment mainly includes: a key bar mounting operation (S1), a key bar alignment adjusting operation (S2), and a donut-shaped stator core bundle mounting operation (S3).

Figure 2:
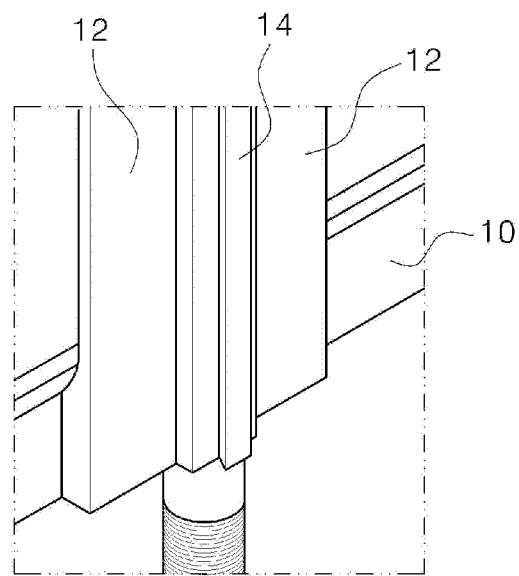
FIG. 2 is a perspective view showing a spring bar type key bar of the related art.

First, the key bar mounting operation will be explained with reference to FIG. 2. As shown in FIG. 2, a pair of spring bars 12 is arranged on the inner peripheral surface of a frame body 10 in a longitudinal direction of the frame body 10, and a key bar 14 is disposed between the pair of spring bars 12.

The key bar mounting operation according to the exemplary embodiment is conducted by using the spring bars 12 as shown in FIG. 2, which is different from the key bar mounting operation through the welding as shown in FIG. 1. More particularly, the process for machining the key bar 14 contains finish and rough milling for the precise alignment of the key bar 14, which will be in detail explained later.

Figure 3:
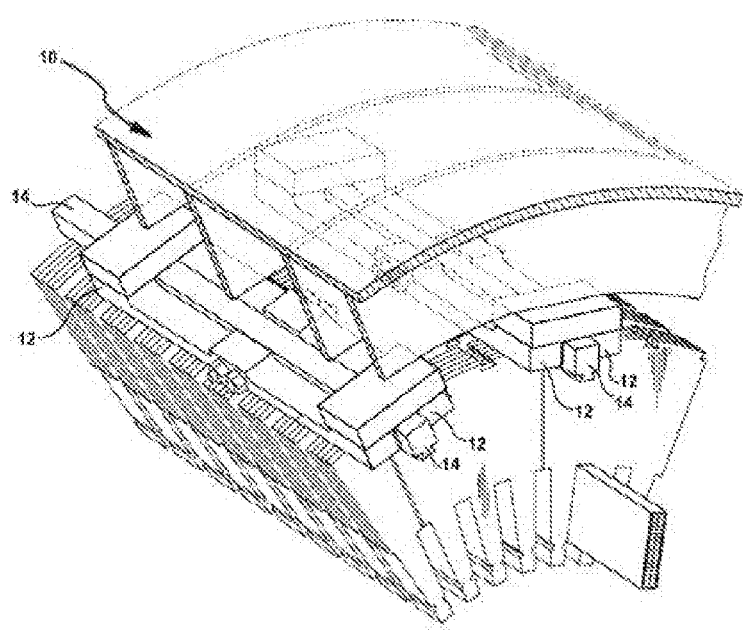
FIG. 3 is a sectional view showing a generator having spring bar type key bars mounted thereon of the related art.
Figure 4:
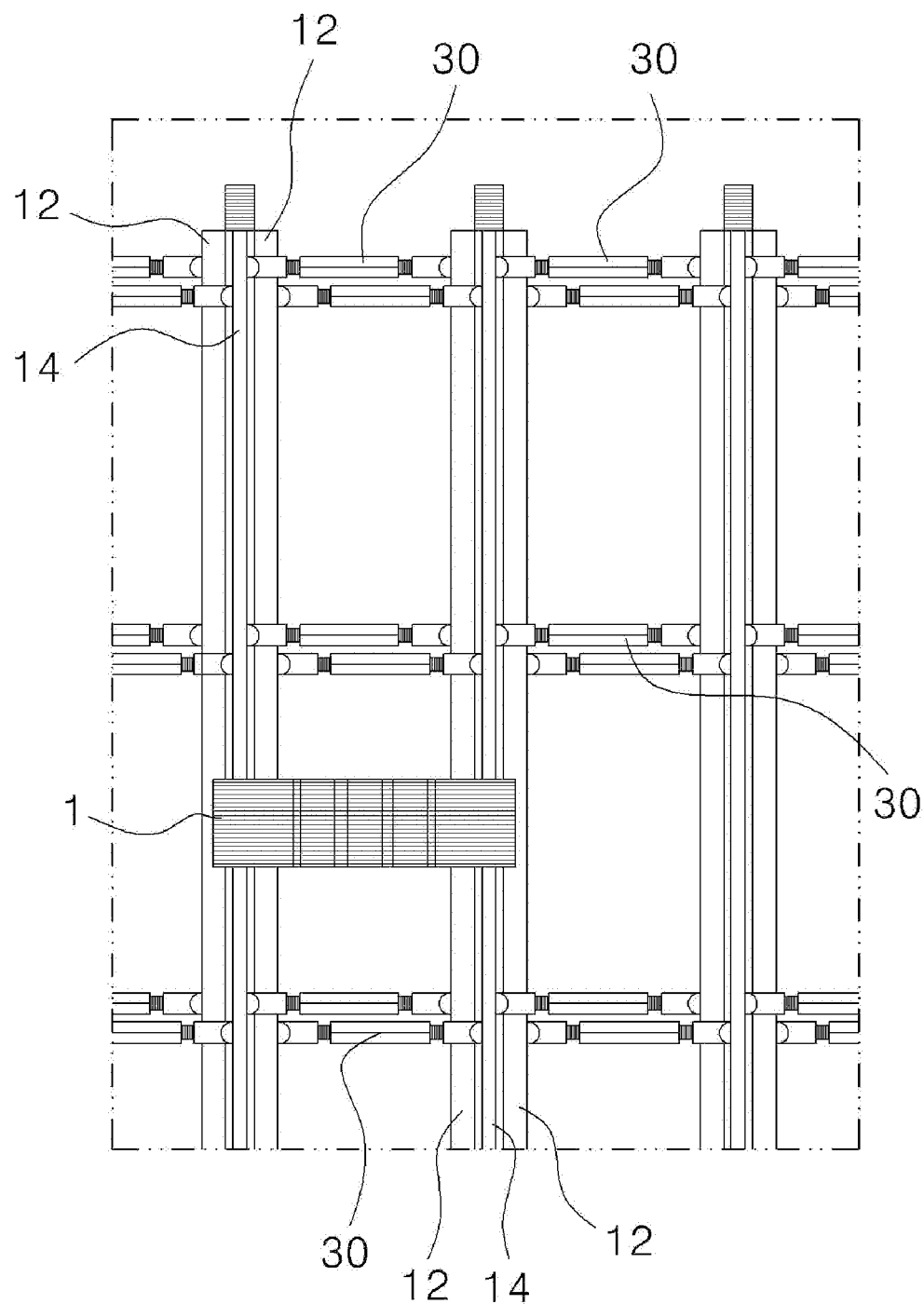
FIG. 4 is an exemplary view showing a method of the related art for mounting a stator core.

On the other hand, if the key bar 14 is mounted on the inner peripheral surface of the frame body 10 by means of the spring bars 12 as shown in FIG. 2, the stator core should be inconveniently disposed manually thereon in the form of a fan-shaped stator core sheet 1, not in the form of a donut-shaped stator core bundle, as shown in FIGS. 3 and 4.

Figure 5:
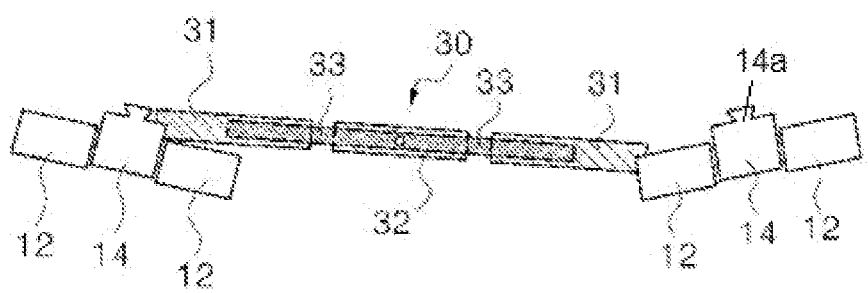
FIG. 5 is a concept view of the related art showing the adjustment of the alignment between key bars and spring bars using first fixing jigs.

As shown in FIGS. 4 and 5, a plurality of first fixing jigs 30 are disposed traversely with respect to the key bar 14 so as to align the key bar 14 and the spring bars 12. In this case, one end of each first fixing jig 30 supports the side surface of the key bar 14, so that if the donut-shaped stator core bundle enters the frame body 10, spatial interference may occur.

So as to remove the above-mentioned problem, accordingly, the key bar alignment adjusting operation is needed. Hereinafter, the key bar alignment adjusting operation will be explained.

Figure 7:
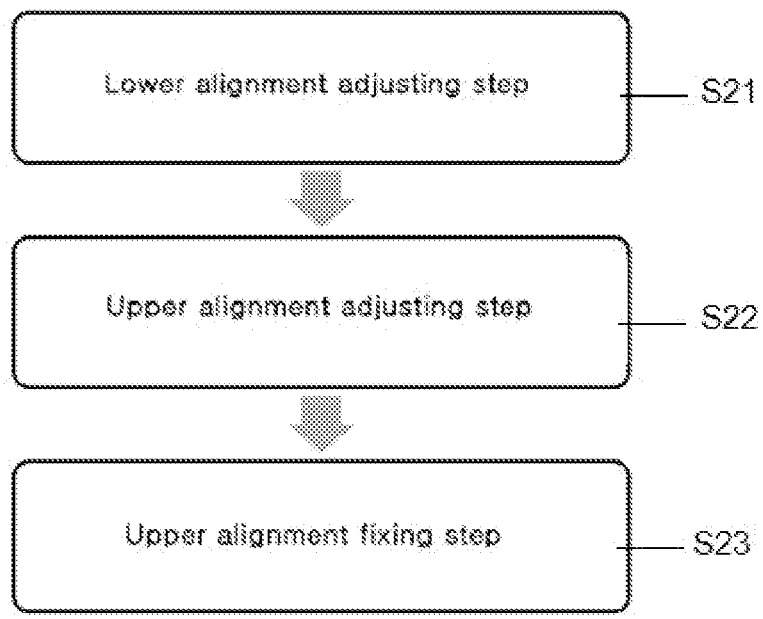
FIG. 7 is a flow chart showing the detailed operations of the key bar alignment adjusting operation according to an exemplary embodiment.
Figure 8:
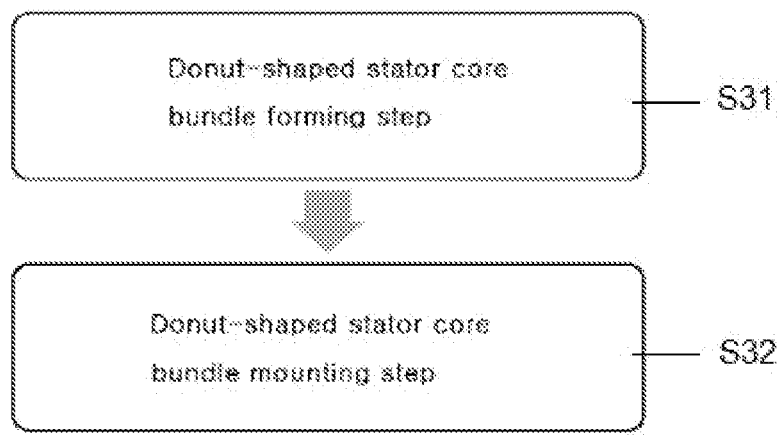
FIG. 8 is a flow chart showing a donut-shaped stator core bundle forming operation and a donut-shaped stator core bundle mounting operation according to an exemplary embodiment.

FIG. 7 is a flow chart showing detailed operations of the key bar alignment adjusting operation (S2) according to an exemplary embodiment. The key bar alignment adjusting operation is conducted so as to remove the interference of the stator core with a plurality of first fixing jigs 30 when the stator core is mounted on the inner peripheral surface of the frame body 10, while achieving the precise alignment of the key bars 14 to allow the donut-shaped stator core bundle to be mounted integrally on the key bars 14.

The precise alignment of the key bars 14 is needed because the stator core bundle should be conveyed and mounted integrally on the key bars 14 in the state where key bar grooves 62 and 110 (See FIGS. 12, 13A and 13B) formed on the outer periphery of the stator core are fitted to dove tails 14a (See FIG. 10A) formed on the key bars 14.

As shown in FIG. 7, the key bar alignment adjusting operation is divided into a lower alignment adjusting operation (S21), a upper alignment adjusting operation (S22), and a upper alignment fixing operation (S23). Hereinafter, the above operations will be sequentially described.

Figure 9:
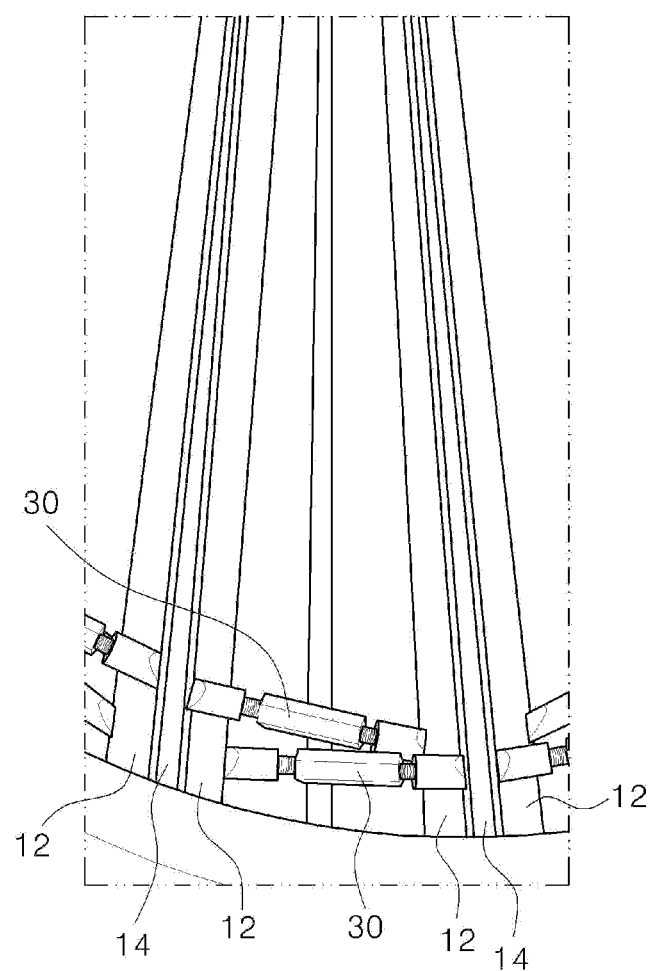
FIG. 9 is a schematic view showing a method for mounting first fixing jigs according to an exemplary embodiment.

First, FIG. 9 is a schematic view showing the installation relation among the key bars 14, the spring bars 12 on which the key bar 14 is disposed, and the first fixing jigs 30.

In the related art, as shown in FIG. 4, about three hundred thirty (330) first fixing jigs 30 are mounted over the lower, intermediate and upper sides of the key bars 14 so as to adjust the whole alignment of the key bars 14.

In this case, as mentioned above, the donut-shaped stator core bundle enters the frame body 10 from the upper sides of the key bars 14, the interference of the stator core bundle with the first fixing jigs 30 arranged on the upper sides of the key bars 14 occurs. Such problem also occurs when a semi-circular stator core bundle or a fan-shaped stator core bundle having a given angle enters the frame body 10. In case of the generator having the spring bar type key bars, accordingly, the fan-shaped stator core sheets should be mounted one by one, as shown in FIG. 4.

According to the exemplary embodiment, as shown in FIG. 9, the first fixing jigs 30 are disposed just on the lower portions of the key bars 14 with respect to the frame body 10 standing vertically, so that the interference in entry can be basically removed.

On the other hand, as shown in FIG. 5, each first fixing jig 30 is a device that adjusts a relative distance, and the first fixing jig 30 has a center shaft 33 on which a screw thread is formed and supports 31 disposed on both ends of the center shaft 33. Further, the first fixing jig 30 has a hexagonal adjustor 32 disposed on the center of the center shaft 33, to which a wrench is fitted, so that the adjustor 32 rotates to adjust the relative distance with the supports 31. Finally, the relative distance between one side of the lower portion of each key bar 14 and one side of the lower portion of one side spring bar 12 of the spring bars 12 on which the key bar 14 is disposed is adjusted to adjust the alignment of the lower side of the key bar 14.

Figure 10A:
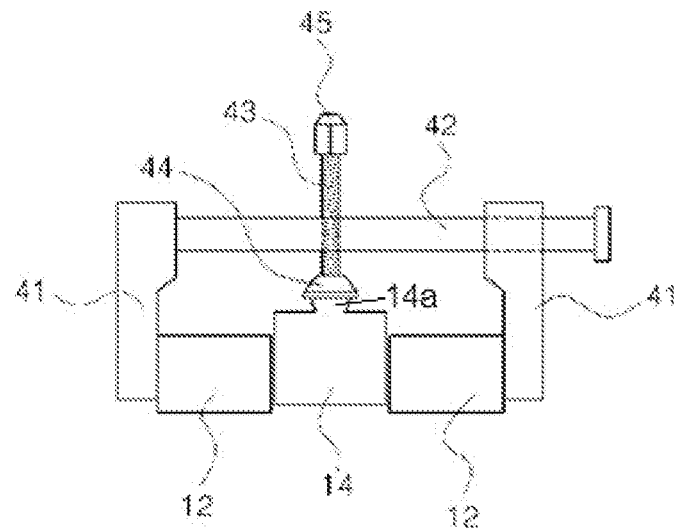
FIGS. 10A and 10B are schematic views showing second fixing jigs and the mounted second fixing jigs according to an exemplary embodiment.
Figure 10B:
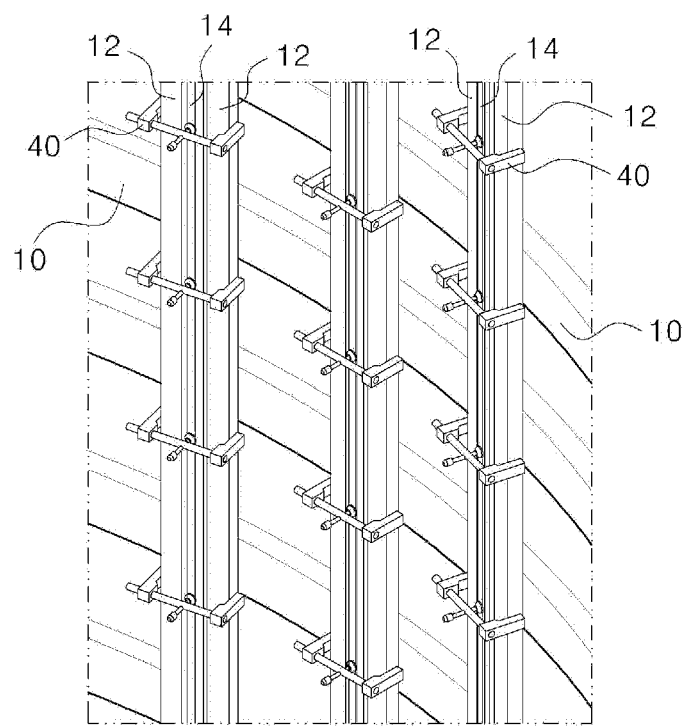

In the exemplary embodiment, the adjustment of the alignment of the upper (and the intermediate) side of the key bar 14 is additionally needed, which is conducted with second fixing jigs 40 as shown in FIGS. 10A and 10B.

As shown in FIGS. 10A and 10B, the second fixing jigs 40 adjust the alignment between one side of the upper portion of the key bar 14 and one side of the upper portion of one side spring bar 12 of the spring bars 12 on which the key bar 14 is disposed.

In more detail, each second fixing jig 40 has a pair of supports 41 fixed vertically to the side surfaces of the spring bars 12 and a connection shaft 42 horizontally connecting the end portions of the supports 41 with each other. The connection shaft 42 has a through hole formed thereon, around which a screw thread is formed vertically, and the second fixing jig 40 further has an adjusting shaft 43 fitted to the through hole in such a manner as to move vertically, the adjusting shaft 43 having a screw thread formed thereon to correspond to the screw thread formed on the through hole.

One end of the adjusting shaft 43 is provided with a contact portion 44 which is brought into contact with the dove tail 14a of the key bar 14, and the other end thereof is provided with a hexagonal head 45 to which a wrench is fitted. As the head 45 rotates, the adjusting shaft 43 rotates, and accordingly, the contact portion 44 formed on one end of the adjusting shaft 43 moves forward and backward, thus adjusting the alignment of the key bar 14.

The second fixing jigs 40 protrude forward from the key bars 14, and accordingly, it is obvious that if the donut-shaped stator core bundle enters, the interference of the second fixing jigs 40 occurs. So as to remove such interference, desirably, the upper alignment adjusted in the upper alignment adjusting operation should be fixed through the upper alignment fixing operation, and after the upper alignment is fixed, the second fixing jigs 40 should be finally removed.

Hereinafter, the upper alignment fixing operation (S23) will be in detail explained with reference to FIG. 11.

Figure 11:
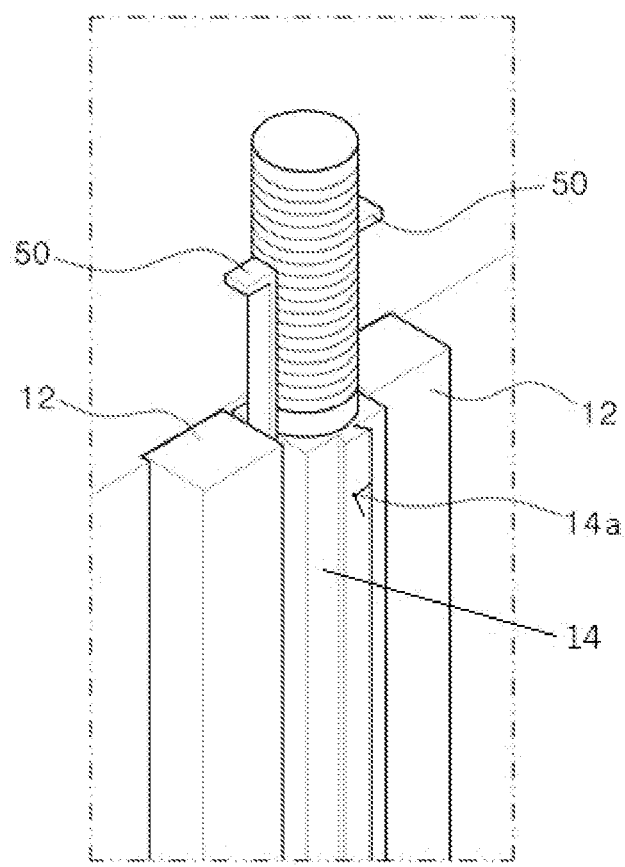
FIG. 11 is a schematic view showing the installation of fixing wedges according to an exemplary embodiment.

As shown in FIG. 11, the upper alignment fixing operation is conducted wherein fixing wedges 50 are disposed on the gaps between the top end of the key bar 14 and the top end portions of the spring bars 12, so as to fix the alignment of the upper side of the key bar 14 adjusted by means of the second fixing jigs 40.

The gaps between the spring bars 12 and the key bar 14 are necessarily generated, and the fixing wedges 50, which become increased in thickness as they go toward the upper portions thereof, are fitted to the gaps, so that the alignment of the upper side of the key bar 14 adjusted by means of the second fixing jigs 40 can be maintained.

The fixing wedges 50 are fitted to the top end portions of the spring bars 12 and the key bar 14, not to the front surfaces thereof, so that even if the donut-shaped stator core bundle enters, no interference therebetween occurs.

According to an exemplary embodiment, on the other hand, the alignment adjustment is simply conducted, and therefore, it is very important to ensure the straightness of the key bar 14 when the key bar 14 is machined before the installation. According to the related art, after the key bar 14 is roughly milled, the finish milling for the dove tail 14a is just conducted, which causes the straightness of the key bar 14 to be deformed over 3 mm.

So as to ensure the straightness of the key bar 14, according to the exemplary embodiment, the rough milling for the machining of the whole shape of the key bar 14 is first conducted, and after fairing is adjusted again, the fine finish machining of the dove tail 14a is conducted. According to the exemplary embodiment, the final deformation in the straightness of the key bar 14 is less than 0.13 mm, which permits the method for mounting the stator core on the generator according to the exemplary embodiment to be carried out.

On the other hand, the rough milling and the finish milling are divided by roughness. Generally, the rough milling has the roughness of 1 μm Ra or more, the finish milling between about 0.5 μm Ra and 0.2 μm Ra, and the super finish milling 0.1 μm Ra or less.

After the key bar alignment adjusting operation, the donut-shaped stator core bundle mounting operation (S3) is conducted wherein the donut-shaped stator core bundle pre-laminated at the outside of the frame body 10 is vertically descended inside the frame body 10 and mounted on the inner peripheral surface thereof, and next, the key bar grooves 62 and 110 formed on the stator core are fitted to the dove tails 14a of the key bars 14.

The donut-shaped stator core bundle is just one example, and accordingly, the stator core sheets 1 in a given unit, that is, in a semi-circular shape, a fan shape having a given angle, and the like are laminated at the outside of the frame body 10, and the laminated stator core sheets are conveyed together and mounted on the inner peripheral surface of the frame body 10. The given angle in the given unit means that if the center angle of one stator core sheet 1 is X, the given angle becomes 2X, 3X or the like. That is, the donut-shaped stator core means the stator core pre-laminated to 360°, and the semi-circular-shaped stator core means the stator core pre-laminated to 180°.

Hereinafter, the donut-shaped stator core bundle mounting operation (S3) will be described with respect to the donut-shaped stator core bundle pre-laminated to 360°.

Before the donut-shaped stator core bundle mounting operation, of course, a donut-shaped stator core bundle forming operation is needed wherein the stator core sheets are laminated one by one at to form the donut-shaped stator core bundle.

Figure 12:
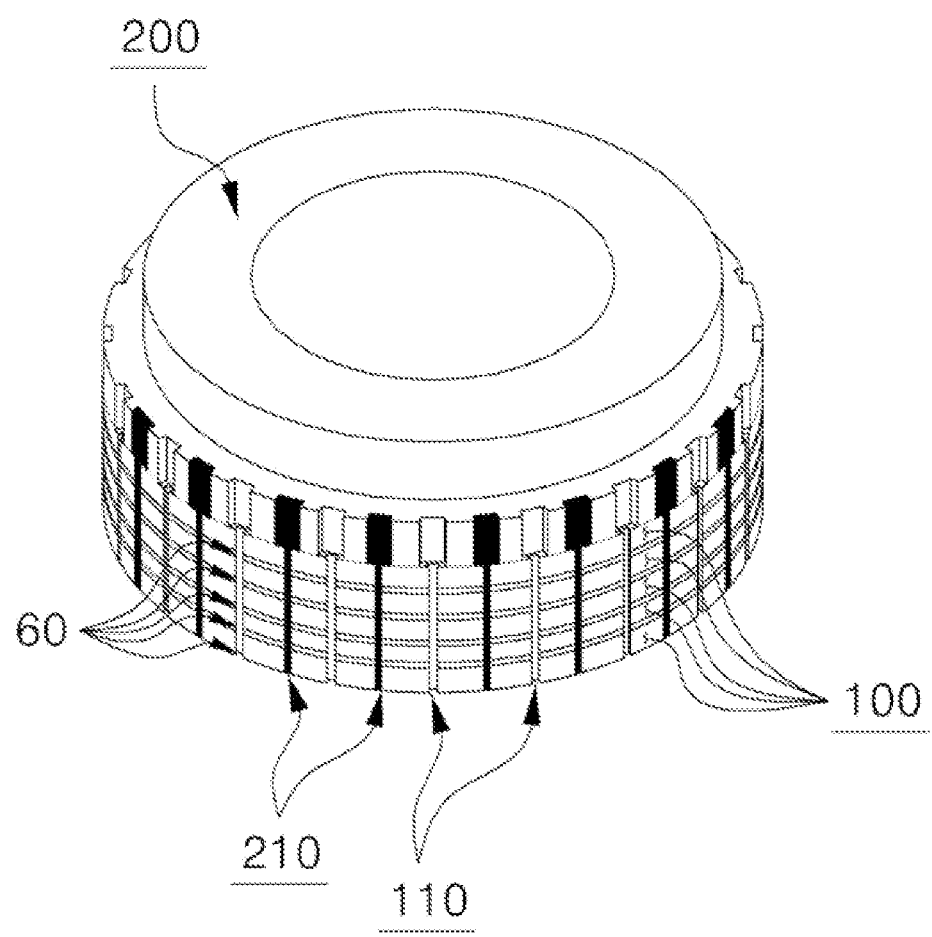
FIG. 12 is a perspective view showing stator core stacking structures, spacing plates, and a conveyor according to an exemplary embodiment.

FIG. 12 shows the donut-shaped stator core bundle.

In the donut-shaped stator core bundle forming operation (S31), first, the fan-shaped single stator core sheets 1 are connected in a circumferential direction to form a donut-shaped stator core sheet. Next, the donut-shaped single stator core sheets are laminated to form a stator core lamination structure 100.

The stator core lamination structures 100 are laminated on top of each other, and spacing plates 60 are desirably mounted between the neighboring stator core lamination structures 100 to provide space in which a cooling fluid moves from the inner peripheral side of the stator core toward the outer peripheral side of the stator core. As shown in FIG. 12, the spacing plates 60 are disposed alternately to the stator core lamination structures 100 to provide the space in given intervals.

Figure 13A:
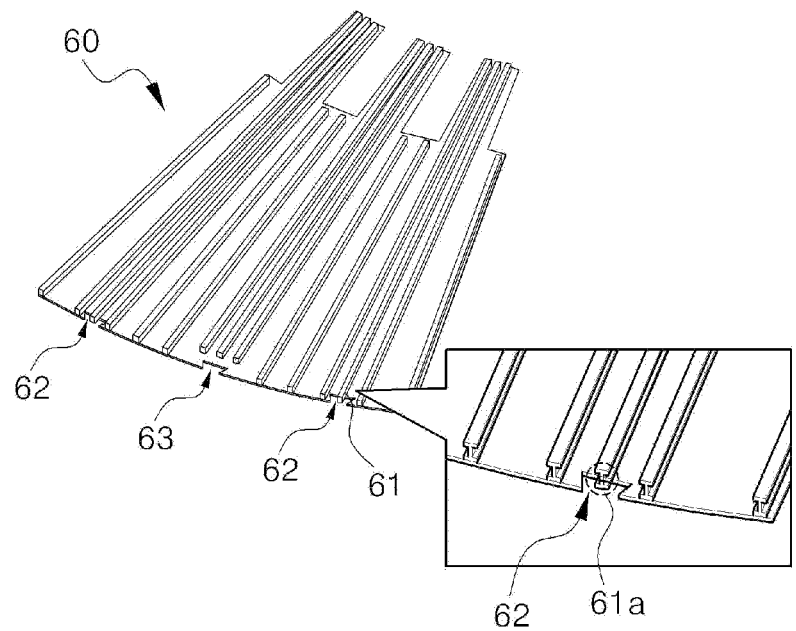
FIGS. 13A and 13B are perspective views showing each spacing plate and spacing beams according to an exemplary embodiment
Figure 13B:
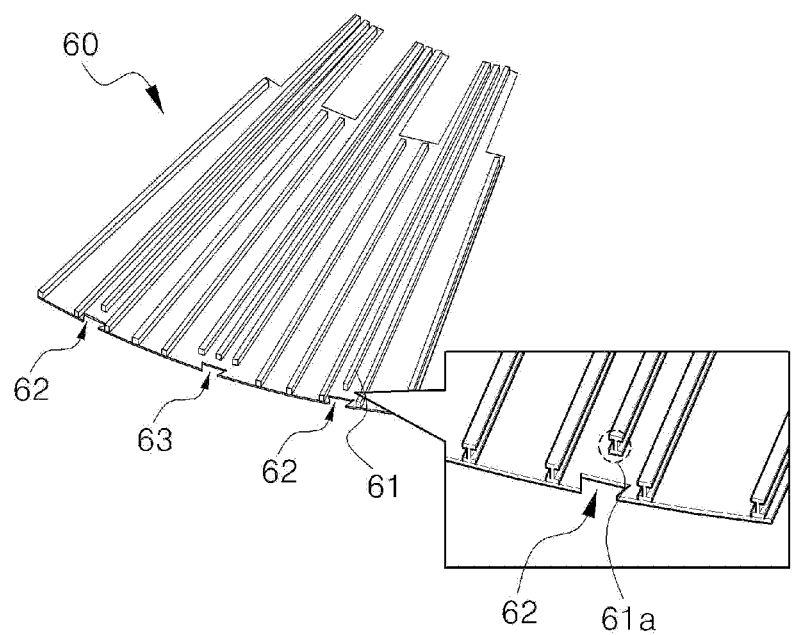

Further, as shown in FIGS. 13A and 13B, each spacing plate 60 has a plurality of spacing beams 61 mounted circumferentially in given intervals to form cooling passages in the space therebetween. In this case, along the cooling passages, generally, hydrogen moves from the inner side of the stator in which a rotor is disposed to a housing.

The stator core bundle in which the spacing plates 60 are disposed has clamping grooves 63 and 120 formed in given intervals on the outer peripheral surface thereof so as to fit clamping jigs 210 of a conveyor 200 thereto.

As shown in FIG. 13B, the spacing beams 61 whose outer ends 61a are located on the positions where the clamping grooves 63 are formed have the outer ends 61a shorter than those of the neighboring spacing beams 61, thus preventing the interference with the clamping jigs 210 of the conveyor 200. The spacing beams 61 extended to the outer peripheral edge of the spacing plate 60 as shown in FIG. 13A serve to support wood wedges, but since the outer ends 61a of the spacing beams 61 are extended to the outer peripheral edge of the spacing plate 60, the interference of the clamping jigs 210 occurs.

So as to solve the problem, as shown in FIG. 13B, the spacing beams 61 whose outer ends 61a are located on the positions where the clamping grooves 63 are formed have the outer ends 61a shorter than those of the neighboring spacing beams 61, and further, the wedges for assembly are desirably supported by means of the application of silicone.

Hereinafter, an explanation on a generator and a stator core assembly according to an exemplary embodiment will be given. An explanation on the repeated contents in the description will be avoided for the brevity of the description, and the characteristics of the generator and the stator core assembly according to the exemplary embodiment will be explained.

According to the exemplary embodiment, the generator includes the cylindrical frame body 10, the plurality of spring bars 12 mounted on the inner peripheral surface of the frame body 10 in a longitudinal direction of the frame body 10 with given intervals in a circumferential direction of the frame body 10, and the plurality of key bars 14 each disposed between the spring bars 12 to support the stator core thereagainst.

The stator core includes the plurality of stator core lamination structures 100 each having the donut-shaped stator core sheets laminated on top of each other. Further, the stator core includes the spacing plates 60 mounted between the neighboring stator core lamination structures 100 to provide the space in which a cooling fluid moves from the inner peripheral side of the stator core toward the outer peripheral side of the stator core. As described above, the stator core lamination structures 100 and the spacing plates 60 have the key bar grooves 62 and 110 formed on the outer peripheral surfaces thereof in such a manner as to be fitted to the dove tails 14a formed on the key bars 14 and the clamping grooves 63 and 120 formed in at least one or more spaces between the neighboring key bar grooves 62 and 110.

The spacing beams 61 whose outer ends 61a are located on the positions where the clamping grooves 63 are formed desirably have the outer ends 61a shorter than those of the neighboring spacing beams 61.

The formation of the short outer ends 61a of the spacing beams 61 prevents the spatial interference with the spacing beams 61 from occurring when the clamping jigs 210 are mounted on the clamping grooves 63 for the conveyance.

According to the exemplary embodiment, on the other hand, the stator core assembly includes the plurality of stator core lamination structures 100 each having the donut-shaped stator core sheets laminated on top of each other and the spacing plates 60 mounted between the neighboring stator core lamination structures 100 to provide the space in which a cooling fluid moves from the inner peripheral side of the stator core toward the outer peripheral side of the stator core.

Further, each spacing plate 60 has the plurality of spacing beams 61 mounted circumferentially in given intervals to form cooling passages in the space therebetween.

Furthermore, the stator core lamination structures 100 and the spacing plates 60 have the key bar grooves 62 and 110 formed on the outer peripheral surfaces thereof in such a manner as to be fitted to the dove tails 14a formed on the key bars 14 and the clamping grooves 63 and 120 formed in at least one or more spaces between the neighboring key bar grooves 62 and 110 while vertically descending the stator core bundle to the interior of the frame body 10. In this case, the spacing beams 61 whose outer ends 61a are located on the positions where the clamping grooves 63 are formed desirably have the outer ends 61a shorter than those of the neighboring spacing beams 61.

As mentioned above, the method for mounting the stator core on the generator according to the exemplary embodiment is capable of mounting the donut-shaped stator core bundle pre-laminated in a given unit at the outside of the frame body on the inner peripheral surface of the frame body, not mounting the stator core in a unit of a sheet in a manual operation in the convention practice thereon, thus achieving greater working efficiencies than the conventional method.

In the description of the exemplary, the position relations used therein has been explained with reference to the attached drawings, and according to aspects of the exemplary embodiment, the position relations may be varied.

Further, all of terms inclusive of technical or scientific terms used therein have the same meaning as will be understood by those skilled in the art. Therefore, they should be defined on the basis of the whole scope of the inventive concept.

While exemplary embodiments have been particularly shown and described above, it would be appreciated by those skilled in the art that various changes may be made therein without departing from the scope and spirit of the present inventive concept as defined by the following claims.

What is claimed is:

1. A method for mounting a stator core on a generator, the generator having key bars and spring bars disposed between the key bars and a frame body, the method comprising:
   pre-laminating stator core sheets to form a stator core bundle in a given unit; and
   conveying the stator core bundle laminated in the given unit to mount the stator core bundle on the inner peripheral surface of the frame body.

2. The method according to claim 1, wherein the stator core bundle is prelaminated at the outside the frame body.

3. The method according to claim 2, wherein the stator core bundle has a shape of a donut, and the donut-shaped stator core bundle is conveyed and mounted on an inner peripheral surface of the frame body.

4. The method according to claim 1, wherein the conveying the stator core bundle to mount the stator core bundle having a donut shape comprises fitting key bar grooves formed on the stator core to dove tails formed on the key bars when the stator core bundle is vertically descended to an interior of the frame body and mounted on an inner peripheral surface of the frame body.

5. The method according to claim 1, further comprising:
   mounting the key bars on the spring bars pre-built on the frame body; and
   adjusting a relative distance between the key bars and the spring bars to adjust the alignment of the key bars.

6. The method according to claim 5, wherein the adjusting the relative distance comprises mounting at least one or more first fixing jigs on the space between one side of the lower portion of each key bar and one side of the lower portion of one side spring bar of the spring bars on which the key bar is disposed, so as to adjust the alignment of the lower sides of the key bars.

7. The method according to claim 6, wherein the adjusting the relative distance further comprises mounting at least one or more second fixing jigs on the space between one side of an upper portion of each key bar and one side of the upper portion of one side spring bar of the spring bars on which the key bar is disposed, so as to adjust the alignment of upper sides of the key bars.

8. The method according to claim 7, wherein the adjusting the relative distance further comprises mounting fixing wedges on gaps between a top end of each key bar and top end portions of the spring bars on which the key bar is disposed, so as to fix the alignment of the upper sides of the key bars adjusted by means of the second fixing jigs.

9. The method according to claim 4, further comprising laminating the stator core sheets at the outside of the frame body to form a donut-shaped stator core bundle, before mounting the donut-shaped stator core bundle.

10. The method according to claim 9, wherein in the forming the donut-shaped stator core bundle, fan-shaped stator core sheets are connected in a circumferential direction to form a plurality of donut-shaped stator core sheets, and the donut-shaped stator core sheets are laminated to form a stator core lamination structure,
   wherein in the state where stator core lamination structures are laminated on top of each other, spacing plates are mounted between neighboring stator core lamination structures to provide space in which a cooling fluid moves from the inner peripheral side of the stator core toward an outer peripheral side of the stator core.

11. The method according to claim 10, wherein each spacing plate comprises a plurality of spacing beams mounted circumferentially in given intervals to form cooling passages in the space therebetween.

12. The method according to claim 11, wherein the stator core bundle in which the spacing plates are disposed comprises clamping grooves formed in given intervals on an outer peripheral surface thereof so as to fit clamping jigs of a conveyor thereto, and the spacing beams in which outer ends are located on the positions where the clamping grooves are formed have the outer ends shorter than the outer ends of the neighboring spacing beams, thus preventing the interference with the clamping jigs of the conveyor.

\* \* \* \* \*